Dec. 27, 1949     L. J. SIVIAN     2,492,371
APPARATUS FOR MEASURING AIR VELOCITY

Filed Jan. 10, 1945     2 Sheets-Sheet 1

INVENTOR
L. J. SIVIAN
BY
W.C. Parnell
ATTORNEY

Dec. 27, 1949 L. J. SIVIAN 2,492,371
APPARATUS FOR MEASURING AIR VELOCITY
Filed Jan. 10, 1945 2 Sheets-Sheet 2
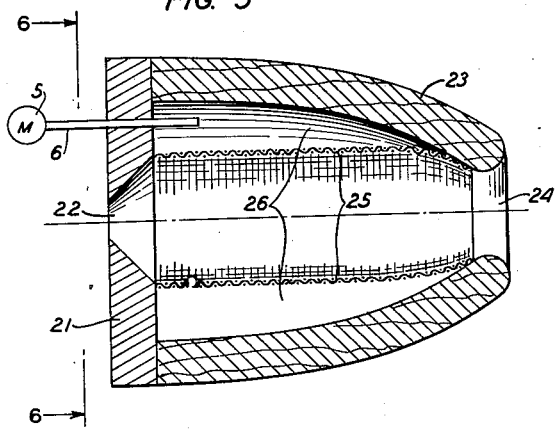
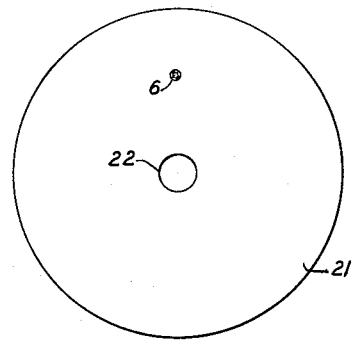
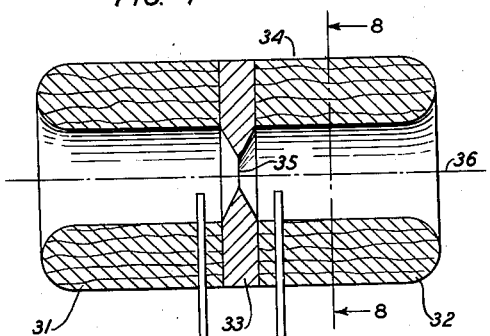
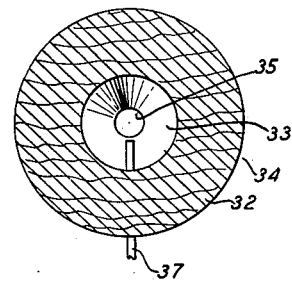
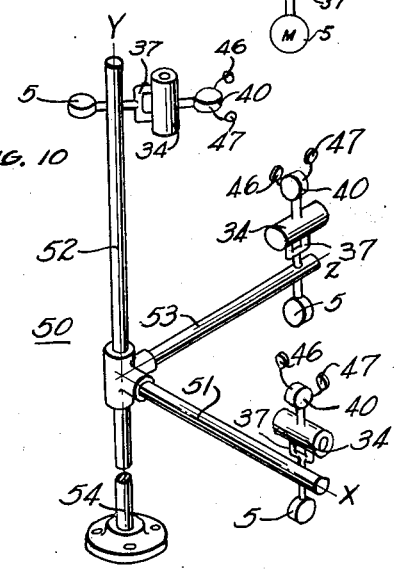
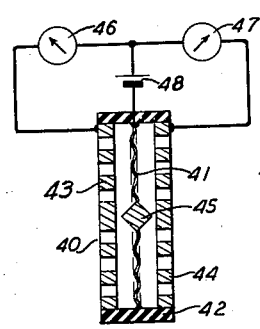
INVENTOR
L. J. SIVIAN
BY
W. C. Parnell
ATTORNEY Patented Dec. 27, 1949

UNITED STATES PATENT OFFICE 2,492,371

APPARATUS FOR MEASURING AIR VELOCITY

Leon J. Sivian, Summit, N. J., assignor to Bell Telephone Laboratories, Incorporated, New York, N. Y., a corporation of New York Application January 10, 1945, Serial No. 572,228

8 Claims. (Cl. 73—194)

This invention relates to the measurement of wind velocities or air speeds of bodies moving through the air and the object of the invention is an anemometer capable of following rapid fluctuations in velocity and of producing an indication at a point remote from the wind sensitive element.

As is well known, the action of wind on any obstacle gives rise to so-called "wind noise" which in most cases is an objectionable effect to be minimized or if possible eliminated. This is particularly true for example in the case of pick-up microphones in locations where they are subject to the action of wind currents.

According to the general features of this invention, the wind noise produced by the action of the air impinging upon an obstacle is utilized to provide a measure of the wind velocity or the air speed of the obstacle. The structure for making such measurements, which may be called an acoustic anemometer, in general will consist of a suitable surface on which the wind impinges and creates noise, a microphone actuated by that noise and suitable transmitting and indicating facilities for measuring the electrical output of the microphone.

The nature of the noise-producing surface or obstacle and the design of the obstacle-microphone combination will, of course, vary widely with the conditions of use. In some cases it may be practicable and convenient to use the microphone structure itself as the obstacle which generates all or a portion of the noise utilized for measuring purposes, in other cases design considerations will make it advisable to provide structurally separate noise generating and microphone elements.

Aural observation and some experimental evidence indicates that wind noise usually has a drooping spectrum, or in other words, the energy content of the noise per cycle decreases with increasing frequency. Aeolian and edge tones and resonances in the obstacle may produce exceptions but with proper design these effects may be effectively eliminated and operation may be based on a continuous noise spectrum dropping off with increasing frequency.

On the other hand the high-frequency content of the noise increases with the wind velocity. That is, the amplitudes of the higher frequencies will show a greater relative increase than the amplitudes of the lower frequencies as the wind velocity is increased so that the center of the useful measurement band may be about 500 cycles per second for winds up to about 30 miles per hour, about 3,000 cycles per second for hurricane velocities and somewhere between 10,000 and 30,000 cycles per second for the speeds of aircraft.

In some cases where the anemometer must operate in the presence of extraneous noise such for example as that due to the mechanical vibration and propeller noise of aircraft, it is advantageous to use as high a frequency band as possible for measuring purposes so that the anemometer output will be determined largely by its own wind noise.

In the measurement of total wind velocity, as it exists in free space, it is, of course, necessary to have the anemometer freely exposed on all sides and to design it for spherical symmetry of response. At the other extreme are cases where measurement in only a single direction is required, as for example in measuring the air speed of an airplane; and in such applications of the invention it may often be desirable to use the combined microphone and obstacle structure referred to above.

In any case in order to simplify the problem of deriving an indication proportional to wind velocity, it is desirable to provide an obstacle structure which will generate a wind noise having a root mean square value which is a continuously rising function of wind velocity.

The invention will be more clearly understood from the following detailed description of a few specific structures embodying the general principles outlined above and the accompanying drawing in which:

Fig. 5 is a sectional view of an acoustic anemometer suitable for vector measurement of wind velocity;

Fig. 6 is a front view of the structure of Fig. 5;

Figs. 7 and 8 are corresponding views of an alternative structure for vector measurement; and Fig. 9 is an auxiliary direction detector for use with the structure of Figs. 7 and 8.

Fig. 10 shows a complete anemometer for vector measurement.

Figure 1:
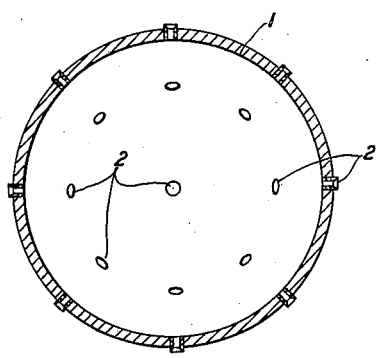
Fig. 1 shows a cross-sectional view of the obstacle of an acoustic anemometer for scalar measurement of wind noise.
Figure 2:
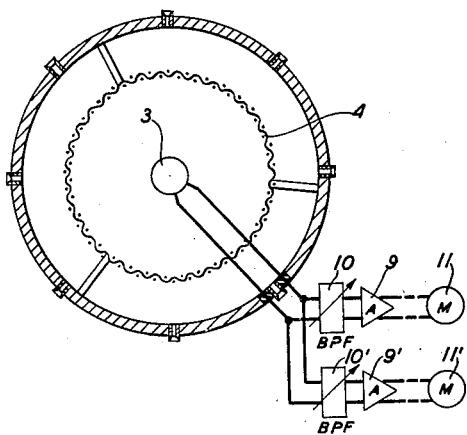
Fig. 2 is an anemometer including a sectional view of the device of Fig. 1.

In Figs. 1 and 2 the obstacle 1 for generating the wind noise is a hollow spherical shell about 5 inches in diameter having a rather large number, such as twenty-six in the structure shown, of identical orifices 2 uniformly spaced over the spherical surface so as to generate noise efficiently in response to the action of wind from any direction. Centrally disposed within the shell is a microphone 3 which is substantially non-directional in its characteristic and therefore responds equally to a given noise level generated at any orifice. When necessary or desirable any residual wind entering the shell through the orifice may be prevented from producing additional wind noise by direct action on the microphone structure by the use of a suitable wind screen. As shown in Fig. 2 this screen may comprise a smaller shell 4 of porous material such as cloth which freely transmits the sound frequencies of interest but effectively shields the microphone from air currents.

Figure 3:
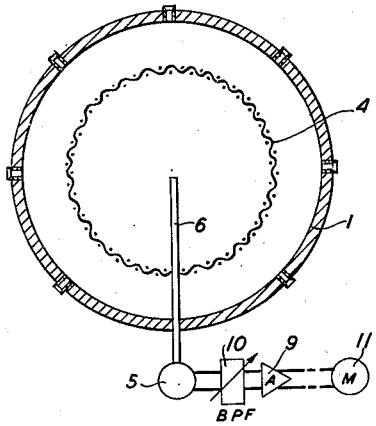
Fig. 3 is an alternate construction in which the microphone is mounted externally of the obstacle.

In cases where it is too expensive or impracticable to obtain a microphone with the required degree of non-directionality, any conventional microphone 5 may be used by locating it externally of the shell 1 as shown in Fig. 3 and operating it by means of search tube 6 leading from it to the center of the shell. The tube diameter should be small enough so that it will act as a substantially non-directional pickup for the frequency range of interest and the tube material should be sufficiently sound absorbent to prevent tube resonances from becoming of a disturbing magnitude. As in the previous case the end of the tube may be shielded when necessary by a wind screen as in Fig. 3.

Figure 4:
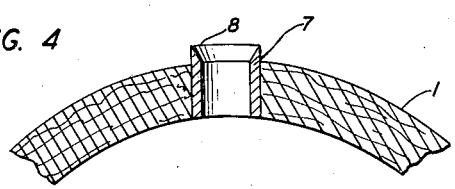
Fig. 4 is a detail of the obstacle and orifice construction.

In either case the shell 1 should be relatively thick and made of highly sound-dissipative material such as resin impregnated wood or equivalent material with high internal damping so that the walls of the shell transmit substantially no sound to the interior. When for example the shell is of the order of 5 inches in diameter, sufficient damping and mechanical strength can be obtained with a shell about ¼ inch thick. In some cases a satisfactory noise level will be generated with simple circular holes in the shell wall. However, when desired, the level may be increased by inserting in the holes short tube sections 7 which are tapered to a sharp edge 8 to form the orifice slightly beyond the outer wall of the shell as shown in Fig. 4.

In use, the structures of Figs. 2 and 3 are mounted in free space so as to be equally sensitive to wind currents from all directions. The leads from the microphone are connected to an amplifier 9 through a suitable filter network 10, and the output of the amplifier is connected to an indicating or recording meter 11. The network 10 is selected or may be adjusted to pass only a band of frequencies representing the principal wind noise components generated by winds of the velocity order of the particular wind to be measured. In this way extraneous noise frequencies may be largely eliminated and the accuracy of measurement correspondingly improved. The network and amplifier ordinarily will be located relatively close to the noise generating obstacle, that is within a few feet or at most a few hundred feet from the obstacle but the meter may be at any desired point which is convenient for observation. In some cases the meter may be relatively close to the pick-up point, but if desired the amplifier output can be transmitted to the meter over a telephone line or even over a radio link as the circumstances require. This telemetric feature obviously is an important advantage over anemometers of the more conventional types. The type meter used will, of course, vary with the nature of the measurements to be made. For ordinary wind velocity measurements it may be a rectifier meter having a relatively long time constant, such as one second, and preferably it will be calibrated to read directly in the desired units such as miles per hour. On the other hand very rapid air velocity fluctuations are to be observed, the meter must be of a fast-acting type such as an oscillograph or equivalent device.

The tubes 7 having orifices 2 shown in Figs. 1, 2, 3 and 4 are of fixed length. However, unlike the conditions existing in an organ pipe wherein the effective dimensions of the pipe remain constant, the effective length of each of the tubes 7 is not fixed or constant but is caused to vary in accordance with the angle at which the wind component approaches the tube, and the turbulence created at the tube. It may be readily seen, therefore, that whereas the organ pipe will resonate at a particular fundamental frequency and produce a tone comprising the fundamental and its related harmonics, the anemometer described herein will generate a noise.

As stated above, the relative amplitudes of the frequencies constituting the noise (the frequency content of the noise) vary with the wind velocity. This phenomenon may also be noted in devices wherein the effective dimension is fixed as in an organ pipe. It has been observed in an organ pipe that the higher frequencies or harmonics are more emphasized when the pipe is strongly blown.

In the anemometer as described above the wind velocity is measured in terms of the absolute magnitude of the wind noise generated. However, since the frequency content of the noise varies with the wind velocity, it is also possible to measure the velocity in terms of the ratios of the intensities of components of different frequencies or bands of frequencies in the noise spectrum. For example the velocity of a given wind might be determined in terms of the ratio between the energies in the 800 to 1200 cycle band and in the 10,000 to 11,000 cycle band. For this purpose a second adjustable band-pass filter 10', a second amplifier 9' and a second meter 11' are connected to the microphone as shown in Fig. 2 and with the filters properly adjusted, the simultaneous meter indications give a ratio corresponding to a particular velocity. This method of measurement obviously is not limited to the structure of Fig. 2 but either this method or the absolute magnitude method may be used with any of the other designs as the circumstances require.

The above structures will give only a scalar measurement of the wind velocity but a vector measurement in any given direction may be obtained with a device of the type shown in Figs. 5 and 6. In this device the front plate 21 faces the direction in which the wind velocity is to be measured and is provided with at least one circular or annular orifice 22. Extending backwardly from the front plate is a suitably contoured housing 23, which may be of the same general construction as the shell of Fig. 1 and has a rear opening 24 for the escape of the air entering the orifice 22. A cylindrical wind screen 25 confines the air flow to the central passage and forms with the housing 23 an annular noise chamber 26 in which there is relatively little movement of the air. The pick-up microphone may be disposed within this chamber but a more compact structure may be obtained by using an external microphone 5 and search tube 6 similar to those of Fig. 3 as shown.

Such a structure can be rotatably mounted if desired to face always in the direction from which the wind is approaching, as for example by the use of the familiar airport wind sock, in which case the noise generated is due very largely to the velocity component normal to the plate 21.

When the structure is fixed, noise will be generated also when the air flow is in the reverse direction, that is when air enters the rear opening 24 and escapes through the orifice 22. For a complete vector measurement under this condition it is therefore necessary to use six units of the type shown in Fig. 5 these units being arranged in opposed pairs for simultaneous measurement of the velocity components along three axes at right angles to each other. Discrimination between winds of the same magnitude but of different directions along an axis is then readily obtained from a comparison of the respective outputs of the two units of a pair.

However, it will be evident that in cases where the wind direction is known as in measuring the air speeds of aircraft, only a single device of this type is required.

Alternatively, vector measurement may be obtained with three units of the type shown in Figs. 7 and 8. In this case the unit 34 comprises two cylindrical members 31, 32 of sound-dissipative material mounted on opposite sides of an annular member 33 which has a central noise generating orifice 35 for wind from either direction along the medial axis 36. The noise so generated is picked up at both sides of the orifice by the U-shaped search tube 37 and conducted to the microphone 5 as in the structure of Fig. 5. The output of these units is, of course, ambiguous as to the direction of wind along the axis of response but this ambiguity can be resolved by a simple detector 40 such as that shown in Fig. 9. In this device a metal diaphragm 41 is mounted in an insulating casing 42 midway between the perforated plates 43, 44 and has a central contact 45 for selectively engaging the plates in accordance with the direction of the wind acting on the diaphragm. The indicators 46 and 47 are connected to the plates and through the common battery 48 to the diaphragm as shown so as to be selectively operated to register the wind direction.

The complete anemometer of this alternative construction would therefore consist of three measuring units 34 of the type shown in Fig. 8 and three associated direction detectors 40 of the type shown in Fig. 9 all of which may be mounted on a single structure 50 as shown in Fig. 10. This structure comprises three mutually perpendicular arms 51, 52 and 53 lying along the OX, OY and OZ axes, respectively, and a common support 54 for mounting the structure in a suitable location where it is freely exposed to wind currents from all directions.

In each case the direction detector 40 is mounted with its diaphragm perpendicular to the axis of the noise generating unit 34 with which it is associated and the unit is mounted with its axis parallel to the axis of its supporting arm. In these positions each unit will respond to the wind velocity component normal to the plane defined by the axes of the other two arms and from the outputs of the microphones so obtained the associated meters may be calibrated by empirical methods.

What is claimed is:

1. An acoustic anemometer comprising a hollow shell of highly sound-dissipative material having a plurality of noise generating orifices spaced over the surface of the shell, microphonic means for generating currents proportional to the noise within the shell generated by the action of air on the orifices, an indicator calibrated in terms of air velocity connected to the microphonic means and means for shielding the microphonic means from the direct action of the air current.

2. An acoustic anemometer according to the preceding claim in which the microphonic means is a non-directional microphone disposed within the shell and surrounded by said shielding means for protecting the microphone from the direct action of air flow through the orifices.

3. An acoustic anemometer according to claim 2 in which the microphonic means comprises a microphone mounted externally of the shell, and a small search tube extending from the microphone to the interior of the shell with said shielding means surrounding the end of the tube.

4. An acoustic anemometer according to claim 2 in which the shell is spherical, the orifices are uniformly spaced over the spherical surface and the microphonic means is non-directional in its response to give a scalar measurement of the velocity of air impinging on the shell.

5. An acoustic anemometer comprising a hollow obstacle formed of highly sound-dissipative material adapted to be placed in the path of an air current to be measured, a member in the obstacle defining an orifice for generating noise in accordance with the velocity of the air, microphonic means actuated by the generated noise, an indicator operated by the output of the microphonic means and means for shielding the microphonic means from the direct action of the air current.

6. In an acoustic anemometer a hollow cylindrical housing of highly sound-dissipative material defining a passage for air currents, a member having an orifice disposed in said passage for generating noise in accordance with the velocity of air flow through the passage, an externally disposed pick-up microphone and a search tube extending from the microphone through the housing to a point adjacent the orifice.

7. An acoustic anemometer according to claim 5 in which the microphonic means is a microphone disposed within the obstacle and protected by said shielding means from the direct action of air flow through the orifice.

8. An acoustic anemometer according to claim 5 in which the microphonic means comprises a microphone mounted externally of the obstacle and a small search tube extending from the microphone to the interior of the obstacle with the end of said tube protected by said shielding means from the direct action of air flow through the orifice.

LEON J. SIVIAN.

REFERENCES CITED

The following references are of record in the file of this patent:

UNITED STATES PATENTS

| Number | Name | Date |
| --- | --- | --- |
| 197,995 | Carroll | Dec. 11, 1877 |
| 1,655,125 | Baule | Jan. 3, 1928 |
| 1,935,445 | Heinz | Nov. 14, 1933 |
| 2,153,254 | Johnston et al. | Apr. 4, 1939 |
| 2,255,771 | Golay | Sept. 16, 1941 |

FOREIGN PATENTS

| Number | Country | Date |
| --- | --- | --- |
| 18,321 | Great Britain | 1898 |